United States Patent
Maekawa et al.

(10) Patent No.: US 7,397,157 B2
(45) Date of Patent: Jul. 8, 2008

(54) TANDEM ROTARY ELECTRIC MACHINE

(75) Inventors: Takeo Maekawa, Okazaki (JP); Shin Kusase, Oobu (JP)

(73) Assignee: Denso Corporation, Kariya (JP)

( * ) Notice: Subject to any disclaimer, the term of this patent is extended or adjusted under 35 U.S.C. 154(b) by 44 days.

(21) Appl. No.: 11/471,672

(22) Filed: Jun. 21, 2006

(65) Prior Publication Data

US 2007/0007847 A1     Jan. 11, 2007

(30) Foreign Application Priority Data

Jul. 11, 2005   (JP)   ............................. 2005-201765
Feb. 6, 2006    (JP)   ............................. 2006-028534

(51) Int. Cl.
    *H02K 16/00*     (2006.01)
(52) U.S. Cl. ...................... 310/114; 310/68 D; 310/263
(58) Field of Classification Search ......... 310/112–114, 310/181, 261, 263, 68 D
    See application file for complete search history.

(56) References Cited

U.S. PATENT DOCUMENTS

| 4,424,464 | A | * | 1/1984  | Ikegami ................... 310/68 D |
| 4,617,485 | A | * | 10/1986 | Nakamura et al. ............ 310/65 |
| 5,149,141 | A | * | 9/1992  | Newhouse .................... 285/13 |
| 5,177,388 | A | * | 1/1993  | Hotta et al. ................. 310/114 |
| 5,233,249 | A | * | 8/1993  | Schaeftlmeier et al. ...... 310/112 |
| 5,306,977 | A | * | 4/1994  | Hayashi ....................... 310/263 |
| 2005/0057113 | A1 | * | 3/2005 | Du et al. ..................... 310/218 |
| 2005/0163628 | A1 | * | 7/2005 | Ionel .......................... 417/374 |

FOREIGN PATENT DOCUMENTS

| JP |   56112866 A | * |  9/1981 |
| JP | A 56-112866  |   |  9/1981 |
| JP | U 57-042565  |   |  3/1982 |
| JP | U 58-136973  |   |  9/1983 |
| JP |   03150028 A | * |  6/1991 |
| JP |   05083906 A | * |  4/1993 |
| JP |   05268752 A | * | 10/1993 |
| JP |   05308751 A | * | 11/1993 |
| JP |   11098789 A | * |  4/1999 |
| JP |   2002171723 A | * | 6/2002 |
| JP |   2002171731 A | * | 6/2002 |
| JP |   2005229748 A | * | 8/2005 |

* cited by examiner

*Primary Examiner*—Dang D Le
(74) *Attorney, Agent, or Firm*—Oliff & Berridge, PLC (57) ABSTRACT

A tandem rotary electric machine, to be applicable to various types of mobile bodies such as vehicles, is equipped with a primary rotary electric machine and a secondary rotary electric machine arranged in tandem mechanism. In the tandem rotary electric machine, heat energy generated by positive diodes and negative diodes forming one or more rectifier devices is dissipated to a stator core of the secondary rotary electric machine. The stator core of the secondary rotary electric machine acts as a heat sink through the housing. The stator core of the secondary rotary electric machine has a less frequency use, and a large size and a large weight than those of the primary rotary electric machine of high frequent and normal is used as a heat sink in order to prevent the temperature rise of the positive diode and the negative diode of the rectifier devices.

14 Claims, 3 Drawing Sheets

TANDEM ROTARY ELECTRIC MACHINE

CROSS-REFERENCE TO RELATED APPLICATIONS

This application is related to and claims priority from Japanese Patent Applications No. 2005-201765 filed on Jul. 11, 2005 and No. 2006-28534 filed on Feb. 6, 2006, the contents of which are hereby incorporated by reference.

BACKGROUND OF THE INVENTION

1. Field of the Invention

The present invention generally relates to a tandem rotary electric machine applicable to various applications, for example, movable bodies such as vehicles, and in particular relates to a tandem rotary electric machine in tandem mechanism having a single rotor shaft and plural pairs of a stator and a rotor, each of the stator rotor pair having a randel type rotor.

2. Description of the Related Art

There are well-known tandem rotary electric machines for vehicle or vehicle alternators capable of generating different voltages by stator-rotor pairs arranged in tandem mechanism and of outputting the different voltages to various electric loads. For example, two related-art documents have disclosed such a tandem rotary electric machine for vehicle, the Japanese patent laid open publication (Unexamined Published patent specification) No. JP-S56-112866 and the Japanese utility model laid open publication (Unexamined Published Utility model specification) No. JP-S57-42565. Those documents have shown a rotary machine for vehicle having a pair of randel-type rotors in tandem mechanism in order to increase the magnitude of output voltage.

Such a tandem rotary electric machine for vehicle is capable of controlling its electricity generation process to output different voltages independently, and is manufactured with a compact size at a relatively low manufacturing cost. Further, such a tandem rotary electric machine for vehicle can reduce its mount space in a vehicle when compared with a case in which two different non-tandem rotary electric machines are mounted separately on a vehicle.

Such a tandem rotary electric machine is applicable to vehicles having a double-voltage power system, for example, which is capable of supplying both a usual 12 volt power source as widely used and a 42 volt power source as a high voltage.

In the conventional tandem rotary electric machine having a double-voltage power supply system described above, a stator rotor pair of a high voltage side having a large rotational inertia mass is arranged at a pulley side, and on the contrary, a stator rotor pair of a low voltage side having a small rotational inertia mass is arranged at the opposite side to the pulley side because this has the most suitable arrangement in conventional design. However, the tandem rotary electric machine for vehicle having the above configuration involves following drawbacks.

In the conventional tandem rotary electric machine having a double-voltage power supply system described above, a low AC voltage generated by the low AC voltage generator is rectified by a rectifier and the rectified DC voltage is then charged into a battery. On the other hand, a high AC voltage generated by the high AC voltage generator needs no rectifier because those AC electric loads such as an electric pot and an electric heater incorporated in a vehicle use directly the high AC voltage that is not rectified.

By the way, because recent vehicles are equipped with high-voltage and high-power electric loads such as an electric power steering and an electric stabilizer that need and consume a direct current DC voltage, the use of such high-power electric loads needs a rectifier device for rectifying the high AC voltage to a high DC voltage, and further requires a mount space for the rectifier device on a vehicle, and still further requires a thermal protection for eliminating the heat generated by the rectifier device for rectifying the high AC voltage. That is, such a tandem rotary electric machine needs a plurality of rectifier components, each rectifier component is usually made of a junction diode, and the number of those rectifier components becomes twice or more of the number of rectifier components used in a usual non-tandem rotary electric machine. Therefore the tandem rotary electric machine requires a complicated and large thermal dissipation mechanism for those rectifier components, and thereby causes a difficulty of efficiently cooling the rectifier components forming the rectifier device.

For more details, the most important matter of the thermal dissipation mechanism for the rectifier device is to reduce the magnitude of heat resistance measured from each rectifier component to a low temperature heat source such as outside air, and to keep a heat sink function when the temperature of the rectifier device is greatly and rapidly increased on flowing a large amount temporal current through the rectifier components in the rectifier device. A weak heat sink capability of the thermal dissipation mechanism rapidly increases the temperature of the rectifier components when temporal current of large magnitude flows through the rectifier.

In general, the heat sink function means the connection between a heat source (such as rectifiers) and a heat accumulator with a large heat capacity and a small heat resistance. This heat accumulator is called the heat sink. In a conventional AC generator (or a rotary electric machine) for vehicle, each rectifier component forming a rectifier device is directly contacted to the outer surface of a rear housing or indirectly contacted to the surface of the rear housing through a good thermal conductive member, and the AC generator uses, as a heat sink, the rear housing or a stator core fixed to the rear housing. Hereinafter, this thermal dissipation mechanism will be referred to as "a rear housing mechanism with fixed rectifier component". Accordingly, it is preferred for the tandem rotary electric machine for vehicle to have a thermal dissipation mechanism, namely, to have the rear housing mechanism with fixed rectifier components in the rectifier device.

However, as described above, because the tandem rotary electric machine for vehicle requires a plurality number of rectifier components in the rectifier device, the area for arranging each rectifier component reduces when compared with a usual non-tandem rotary machine. In other words, the total output power of and the total heat amount generated by the rectifier device in the tandem rotary electric machine become twice or more of those of the usual non-tandem rotary electric machine. Because the tandem rotary electric machine has a longer construction along its rotor shaft direction when compared with a usual non-tandem rotary electric machine, the area of the end face of the housing is little increased. That is, because the tandem rotary electric machine must have the total 12 rectifier components (24 rectifier components in a dual rectifier arrangement), that are twice of the usual non-tandem rotary electric machine, it is necessary to arrange and fix the rectifier components to the arrangement area of the end surface of the housing. This configuration reduces in half the capability of the heat sink (thermal absorption) of the housing and the stator core corresponding to each rectifier component.

Although it is possible to increase the size or thickness of the housing in order to enhance the heat sink capability of the rear housing mechanism with fixed rectifier component or the thermal dissipation mechanism, those manners are impractical because they also increase the entire size, volume, and weight of the tandem rotary electric machine.

SUMMARY OF THE INVENTION

It is an object of the present invention to provide an improved tandem rotary electric machine or a vehicle alternator in tandem mechanism having a highly thermal dissipation capability to dissipate the heat generated by rectifier devices without increasing the total size, volume and weight of the tandem rotary electric machine, and capable of outputting a large output voltage.

According to one aspect of the present invention, a tandem rotary electric machine has a primary stator-rotor pair (or a primary rotary electric machine) and a secondary stator-rotor pair (or a secondary rotary electric machine) arranged in tandem mechanism, housing, and one or more rectifier devices. Each of the primary stator-rotor pair and the secondary stator-rotor pair has a rotor core on which field windings are wound and a stator core on which stator coils are wound. Each rotor core is fixed to a same rotary shaft that is driven, for example, by an engine in a vehicle. The rotor cores are adjacently arranged to each other. The housing covers both the primary stator-rotor pair and the secondary stator-rotor pair therein. The stator cores of both the primary stator-rotor pair and the secondary stator-rotor pair are fixed to the housing. The rectifier device is configured to rectify different AC output currents from the primary stator-rotor pair and the secondary stator-rotor pair. The rectifying device is fixed directly to one end of the housing or fixed to one end of the housing through an interposition member in order to dissipate the heat generated by the rectifier device.

The tandem rotary electric machine further has a pulley and a controller. The pulley is fixed to a protruded part of the rotary shaft. One end part of the rotary shaft is protruded from one end surface of the housing, which is opposed in position to the other end surface of the housing at which the rectifier device is mounted. The controller is configured to control exciting currents flowing through the primary stator-rotor pair and the secondary stator-rotor pair.

Such a tandem rotary electric machine is applicable to movable bodies such as vehicles, and which is capable of generating and outputting different direct current (DC) voltages to various electric loads and capable of controlling those difference DC voltages independently.

The primary stator-rotor pair and the secondary stator-rotor pair can provide different electric powers to electric loads of different types independently, and can also provide the electric powers to same electric loads. In particular, the primary stator-rotor pair is capable of generating and outputting a normal electric power to the electric loads of high frequent and normal use. The secondary stator-rotor pair is capable of generating and outputting a highly electric power to the electric loads of less frequent use, namely, of intermittent use. It is acceptable to connect both the electric loads of high frequent use and the intermittent use to the same power voltage, in addition, on the contrary, acceptable to connect them to different power voltages.

Furthermore, it is possible to add different output voltages from the primary stator-rotor pair and the secondary stator-rotor pair and then to output the added and rectified voltage to the electric loads of less frequent use or intermittent use. Still further, it is possible to rectify and output the output voltage from the primary stator-rotor pair to the electric loads of high frequent use or intermittent use.

In particular, the secondary stator-rotor pair generates and outputs a high rated electric power than a low rated electric power generated by the primary stator-rotor pair. The secondary stator-rotor pair is placed close to the rectifier device side when compared in position with the primary stator-rotor pair. Further, the stator core of the secondary stator-rotor pair has large size and weight than those of the stator core of the primary stator-rotor pair.

That is, according to the present invention, the secondary stator-rotor pair is placed at the rectifier device side, not at the pulley side. This arrangement of the present invention contradicts the configuration of conventionally available tandem rotary electric machines in which a secondary stator-rotor pair of large gyrating mass capable of providing a high rated electric power is placed at the pulley side. Because the stator core of the secondary stator-rotor pair having a large gyrating mass, a large weight, and a large heat capacity is placed at the rectifier device side or close to the rectifier device, the rectifier device can use, as heat sink, the stator core with a large heat capacity of the secondary stator-rotor pair through the housing of a relatively small heat resistance. This configuration of the tandem rotary electric machine of the present invention can efficiently prevent the temperature rise of plural rectifying components forming the rectifier device, that are faced to severe condition when compared with a normal rotary electric machine or alternator, and can eliminate the inhibition of the magnitude of maximum output current caused by the temperature rise of the rectifier device without increasing the volume and weight of the rotary electric machine.

According to another aspect of the present invention, a tandem rotary electric machine has a primary stator-rotor pair (or a primary rotary electric machine), a secondary stator-rotor pair (or a secondary rotary electric machine), housing, a primary rectifier device, and a secondary rectifier device. Each of the primary stator-rotor pair and the secondary stator-rotor pair has a rotor core on which field windings are wound and a stator core on which stator coils are wound. Each rotor core is fixed to the same rotary shaft, for example, driven by an engine mounted on a vehicle. Those rotor cores are adjacently arranged to each other. The housing covers both the primary stator-rotor pair and the secondary stator-rotor pair, and to which the stator cores in the primary and secondary stator-rotor pairs are fixed. The primary rectifier device is configured to rectify output AC current from the primary stator-rotor pair. The primary rectifier device is fixed directly to one end of the housing or fixed to one end of the housing through an interposition member in order to dissipate heat generated by the primary rectifier device. The secondary rectifier device is configured to rectify output current from the secondary stator-rotor pair. The secondary rectifier device is fixed directly to one end of the housing or fixed to one end of the housing through an interposition member in order to dissipate heat generated by the secondary rectifier device.

In the tandem rotary electric machine, the secondary stator-rotor pair is capable of generating and outputting a high rated electric power than a low rated electric power generated by the primary stator-rotor pair. The secondary stator-rotor pair is placed at one end of the housing on which the secondary rectifier device is fixed. The stator core of the secondary stator-rotor pair has larger size and weight than those of the stator core of the primary stator-rotor pair.

For example, the tandem rotary electric machine further has a pulley and a controller. The pulley is fixed to a protruded part of the rotary shaft. The protruded part of the rotary shaft is protruded from one end surface of the housing, which is opposed in position to the other end surface of the housing at which the rectifier device is placed. The controller is configured to control exciting currents flowing through the primary stator-rotor pair and the secondary stator-rotor pair. Such a tandem rotary electric machine is applicable to movable bodies such as vehicles, and which is capable of generating and outputting different direct current (DC) voltages and of controlling those difference DC voltages independently.

According to the tandem rotary electric machine of the present invention, the primary stator-rotor pair and the secondary stator-rotor pair can provide different electric powers to different types of electric loads independently, but, can provide the electric power to same electric loads. In particular, the primary stator-rotor pair is capable of generating and outputting the electric power to the electric loads of high frequent and normal use. The secondary stator-rotor pair is capable of generating and outputting the electric power to the electric loads of less frequent use, namely of intermittent use. It is acceptable to connect both the electric loads of high frequent use and the intermittent use to the same power voltage, and also acceptable to connect them to different power voltages. Furthermore, it is possible to add rectified different output voltages from the primary stator-rotor pair and the secondary stator-rotor pair, and then to output the added voltage to the electric loads of less frequent use and to output the rectified output voltage from the primary stator-rotor pair to the electric loads of high frequent use, namely, of intermittent use.

In particular, the secondary stator-rotor pair generates and outputs a high rated electric power. The primary stator-rotor pair generates and outputs a low rated electric power lower than the high rated electric power. The secondary stator-rotor pair is placed close to the secondary rectifier device side when compared in position with the primary stator-rotor pair. Further, the stator core of the secondary stator-rotor pair has larger size and weight than those of the stator core of the primary stator-rotor pair.

That is, according to the present invention, the secondary stator-rotor pair is placed at and close to the secondary rectifier device side. Because the stator core of the secondary stator-rotor pair having a large gyrating mass, a large weight, and a large heat capacity is placed at or close to the secondary rectifier device side, the secondary rectifier device can use, as heat sink, the stator core with a large heat capacity of the secondary stator-rotor pair through the housing of a relatively small heat resistance. This configuration of the tandem rotary electric machine of the present invention can efficiently prevent the temperature rise of plural rectifying components that form the rectifier device, that are faced to severe condition when compared with a normal alternator, and can eliminate the inhibition of the magnitude of maximum output current caused by the temperature rise of the rectifier device without increasing the volume and weight of the rotary electric machine.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Hereinafter, various embodiments of the present invention will be described with reference to the accompanying drawings. In the following description of the various embodiments, like reference characters or numerals designate like or equivalent component parts throughout the several diagrams. A tandem rotary electric machine or a vehicle alternator according to the present invention is applicable to various devices and mounted on movable bodies such as a vehicle.

First Embodiment

The entire configuration of a tandem electric rotary machine for vehicle (or a vehicle alternator), having a dual stator-rotor pair configuration, according to the first embodiment of the present invention will now be described with reference to FIG. 1.

Figure 1:
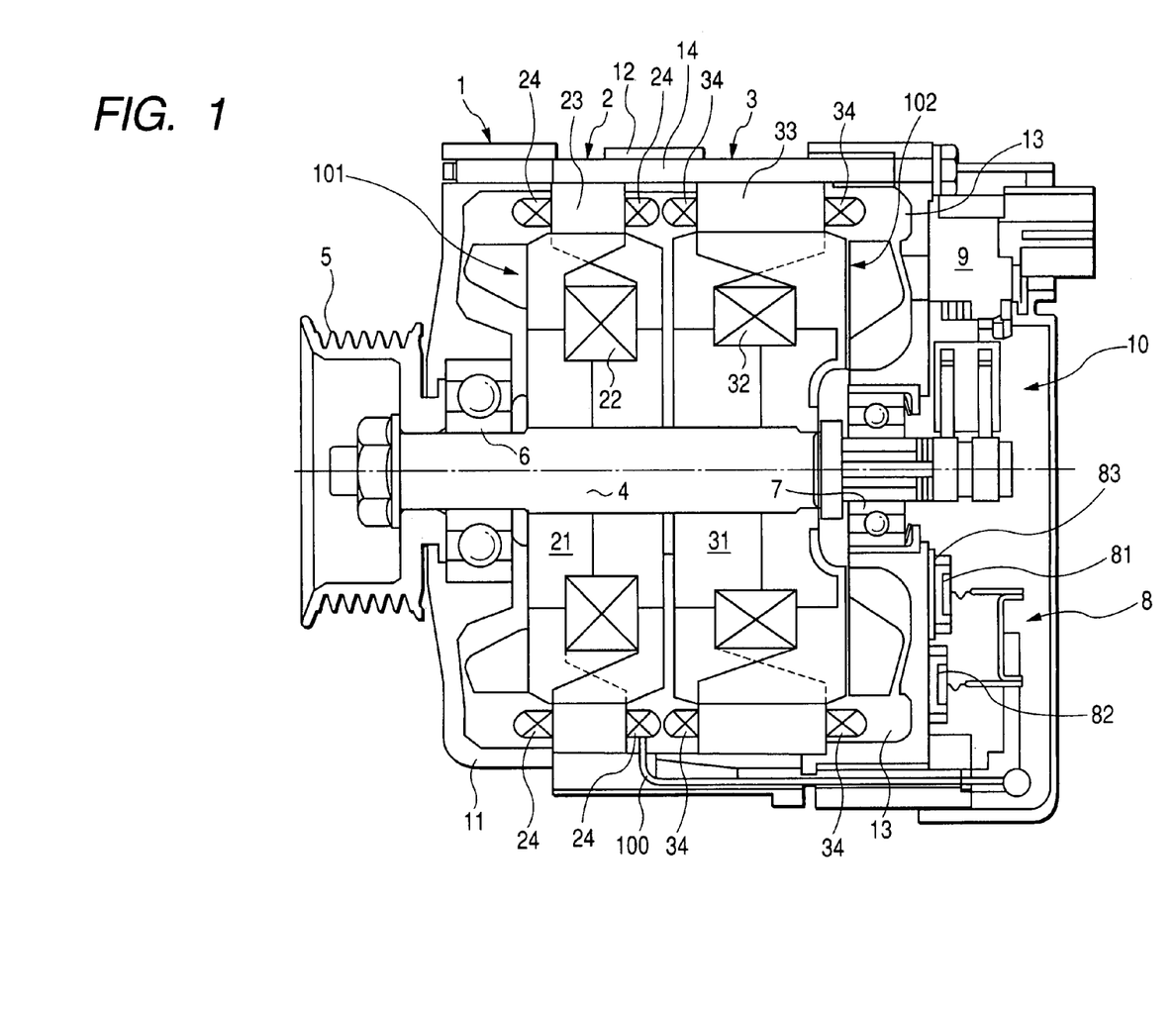
FIG. 1 is a sectional view in a rotor shaft direction of a tandem electric rotary machine having randel type rotary cores according to a first embodiment of the present invention.

FIG. 1 is a sectional view in a rotor shaft direction of the tandem electric rotary machine having a primary rotary electric machine and a secondary rotary electric machine arranged in tandem configuration according to the first embodiment.

Entire Configuration of the Tandem Electric Rotary Machine of the First Embodiment In FIG. 1, a housing 1 comprises a front housing 11, a center housing 12, and a rear housing 13. Those housing components 11, 12, 13 of the housing 1 are fixed tightly together by a through bolt 14. A rotor shaft 4 is supported to the housing 1 through bearings 6 and 7. A pulley 5 is fixed to the front end part of the rotor shaft 4 that protrudes from the front end surface of the housing 1. A rectifier device 8, a regulator 9, and a slip ring power supply device or mechanism 10 are fixed to the rear housing 13 placed at the rear end of the secondary rotary electric machine section 3.

The primary rotary electric machine (or a primary stator-rotor pair) 2 has a randel type rotor core 21, field coils 22, a stator core 23, stator coils 24. The individual field coil 22 is wound on the randel type rotor core 21. The stator core 23 is arranged in radial direction on the outer surface of the randel type rotor core 21. The individual stator coil 24 is wound on the stator core 23.

The secondary rotary electric machine (or a secondary stator-rotor pair) 3 has a randel type rotor core 31, field coils 32, a stator core 33, stator coils 34. The individual field coil 32 is wound on the randel type rotor core 31. The stator core 33 is arranged in radial direction on the outer surface of the randel type rotor core 31. The individual stator coil 34 is wound on the stator core 33. The mechanism made of the primary and secondary rotary electric machines 2 and 3 is also called a dual stator-rotor pair configuration.

Because each of the primary and secondary rotary electric machines 2 and 3 is a rotary electric machine having a usual randel type rotor core, and its configuration and operation are well known, the detailed explanation thereof is omitted here.

In the tandem electric rotary machine for vehicle of the first embodiment, the slip ring power supply device 10 has a pair of slip rings to which a voltage of the battery is supplied through a pair of brushes. The rotor shaft 4 is equipped with exciting current control transistors (not shown). Those transistors (not shown) control the exciting current independently to be supplied to both the field coils 22 and 32 through a pair of slip rings in the slip ring power supply device 10 according to a control signal supplied from the regulator 9. The control signal is transferred optically from the regulator 9 to the exciting current control transistors through optical devices (not shown) such as photo couplers under non-contact condition.

The stator coils 24 supply the electrical power to a 12 V battery to be mounted on a vehicle and electric loads, and the stator coils 34 supply the electrical power to a rear wheel drive motor in order to assist the usual vehicle driving.

Pair of Stator and Rotor

In the first embodiment, the secondary rotary electric machine 3 is capable of generating and supplying a large voltage (42 volts) rather than a usual voltage (12 volts) in the primary rotary electric machine 2. It is so set that the secondary rotary electric machine 3 has a less frequent use than the primary rotary electric machine 2. Accordingly, the temperature of the stator core 33 in the secondary rotary electric machine 3 is far lower than that of the stator core 23 in the secondary rotary electric machine 2. However, during the operation, the secondary rotary electric machine 3 is capable of outputting a temporal large electric power to be supplied to high voltage electric loads.

Rectifier Device 8

A description will now be given of the configuration and operation of the rectifier device 8 with reference to FIG. 1.

The rectifier device 8 comprises a pair of three phase full wave rectifiers. As has been well known, each three phase full wave rectifier comprises three upper-arm rectifying components (positive diodes or plus (+) diodes) and three bottom-arm rectifying components (negative diodes or minus (−) diodes). Accordingly, the rectifier device 8 of the tandem rotary electric machine of the first embodiment has six positive (plus) diodes and six negative (minus) diodes. On supplying a large current, the total 12 positive (plus) diodes and the total 12 negative (minus) diodes connected in parallel are used. FIG. 1 shows only two diodes for explanation brevity, the positive (plus) diode 81 and the negative (minus) diode 82. The positive (plus) diode 81 is fixed to the rear end surface of the rear housing 13 through an insulating sheet 83. The negative (minus) diode 82 is fixed directly to the rear end surface of the rear housing 13.

A description will now be given of the manner of the thermal dissipation mechanism of the positive (plus) diode 81 and the negative (minus) diode 82.

The secondary rotary electric machine 3 supplies the electric power to the rear wheel driving motor during a special driving state in a vehicle.

On supplying the electric power by the secondary rotary electric machine 3, a temporal large current flows through the three phase full wave rectifying components in the rectifier device 8 for rectifying the output current from the secondary rotary electric machine 3 in order to perform rapid driving of the rear wheel drive motor. Thereby, the positive (plus) diodes 81 and the negative (minus) diode 82 are rapidly heated, namely the temperature of both the diodes 81 and 82 rapidly rise.

In the configuration of the tandem electric rotary machine of the first embodiment, because the stator coils 34 in the secondary rotary electric machine 3 are tightly contacted to or close to the rear housing 13, the stator core 33 can absorb the heat generated by both the positive (plus) diode 81 and the negative (minus) diode 82 rapidly and efficiently. This can prevent the temporal temperature rising of the secondary rotary electric machine 3. In addition, because the primary rotary electric machine 2 are usually supplying the low level electric power to the battery (omitted from drawings) and generating heat and are separated from both the positive (plus) diode 81 and the negative (minus) diode 82, it is possible to prevent the thermal influence to both the positive (plus) diode 81 and the negative (minus) diode 82 by the primary rotary electric machine 2.

Furthermore, because the secondary rotary electric machine 3 generating a high voltage is placed close to the rectifier device 8, AC current wirings can be placed in compact size around the rectifier device 8 and it is thereby possible not to pay attention in insulation to the secondary rotary electric machine 3. On the contrary, it is necessary to pay attention of wiring insulation in the primary rotary electric machine 2 supplying a low voltage.

Second Embodiment

Figure 2:
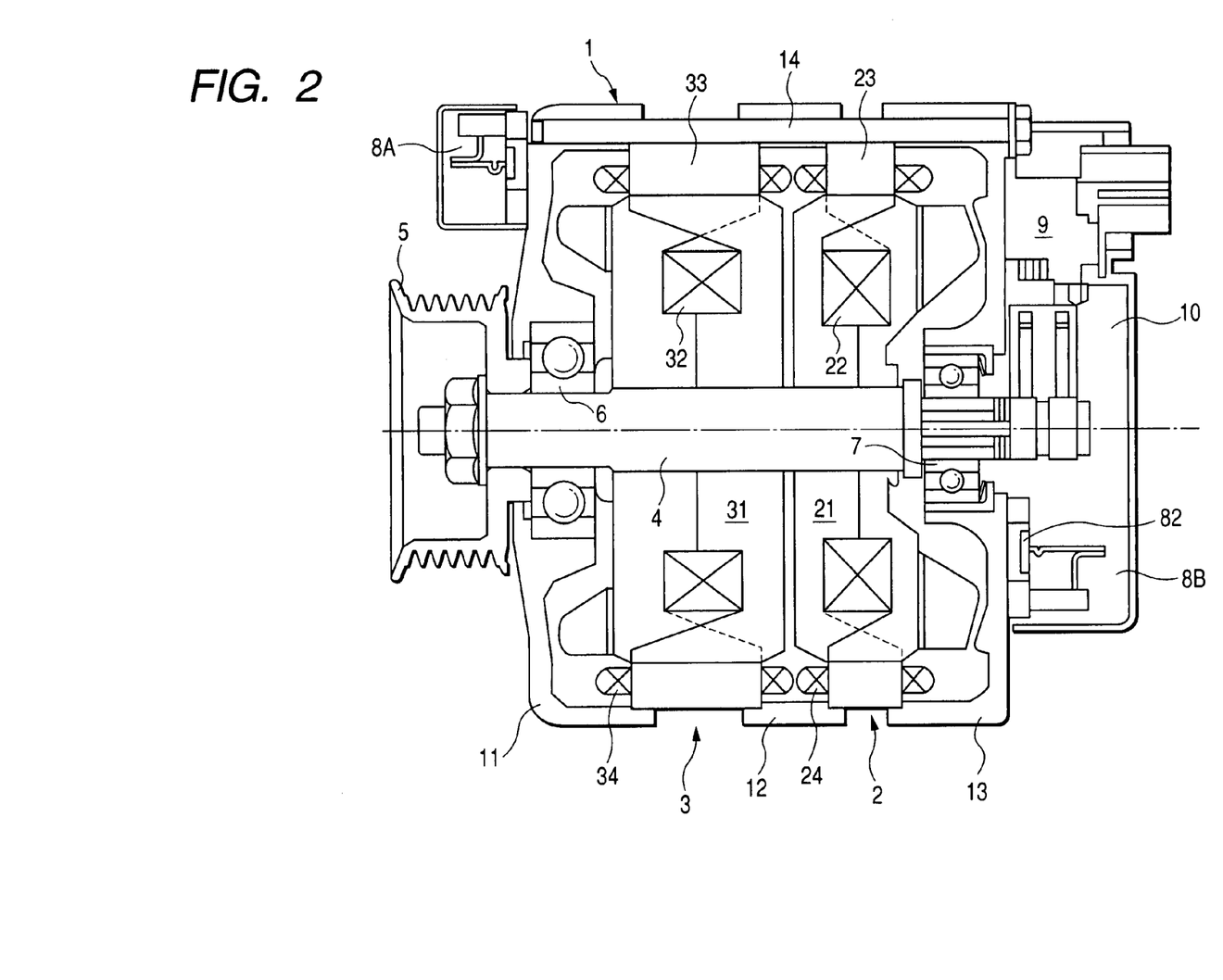
FIG. 2 is a sectional view in a rotor shaft direction of a tandem electric rotary machine having randel type rotary cores according to a second embodiment of the present invention.

The entire configuration of a tandem electric rotary machine for vehicle (or the vehicle alternator) according to the second embodiment of the present invention will now be described with reference to FIG. 2. FIG. 2 is a sectional view in a rotor shaft direction of the tandem electric rotary machine of the second embodiment.

The tandem electric rotary machine for vehicle according to the second embodiment is basically same in configuration of the tandem electric rotary machine for vehicle of the first embodiment. Accordingly, a difference configuration and operation between the first embodiment and the second embodiment will be explained.

In FIG. 2, reference character 8A designates a rectifier device for the secondary rotary electric machine (or the secondary stator-rotor pair) 3, which is capable of rectifying output current from the secondary rotary electric machine 3. The rectifier device 8A for the secondary rotary electric machine 3 is mounted on the front housing 11 of the housing 1. The rectifier device 8A for the secondary electric machine 3 is separated in position from the pulley 5. Reference character 8B designates a rectifier device for the primary rotary electric machine (or the primary stator-rotor pair) 2, which is capable of rectifying output current from the primary rotary electric machine 2. The rectifier device 8B for the primary rotary electric machine 2 is mounted on the rear housing 13 of the housing 1.

Further, as shown in FIG. 2, the secondary rotary electric machine 3 is placed at the front side of the tandem rotary electric machine where the pulley 5 and the rectifier device 8A are mounted, and the primary rotary electric machine 2 is placed at the rear side of the tandem rotary electric machine where the rectifier device 8B is mounted.

The high voltage generated by the primary rotary electric machine 3 is supplied to the rectifier device 8A placed on the end surface of the front housing 11, and the low voltage generated by the primary rotary electric machine 2 is supplied to the rectifier device 8B placed on the end surface of the rear housing 13. Accordingly, it is possible for the above configuration to dissipate the heat generated in the rectifier device 8A and to solve the drawback in space caused by the conventional configuration where both the rectifier devices for the primary and the secondary rotary electric machines are placed in the same area. Furthermore, according to the configuration of the tandem rotary electric machine of the second embodiment, it is possible to separate the wiring spaces through which the electric power generated by both the primary rotary electric machine 2 and the secondary rotary electric machine 3 are provided. This introduces that the wirings are placed in a compact area and to improve the electrical insulation between the wirings and the rectifier devices.

Third Embodiment

Figure 3:
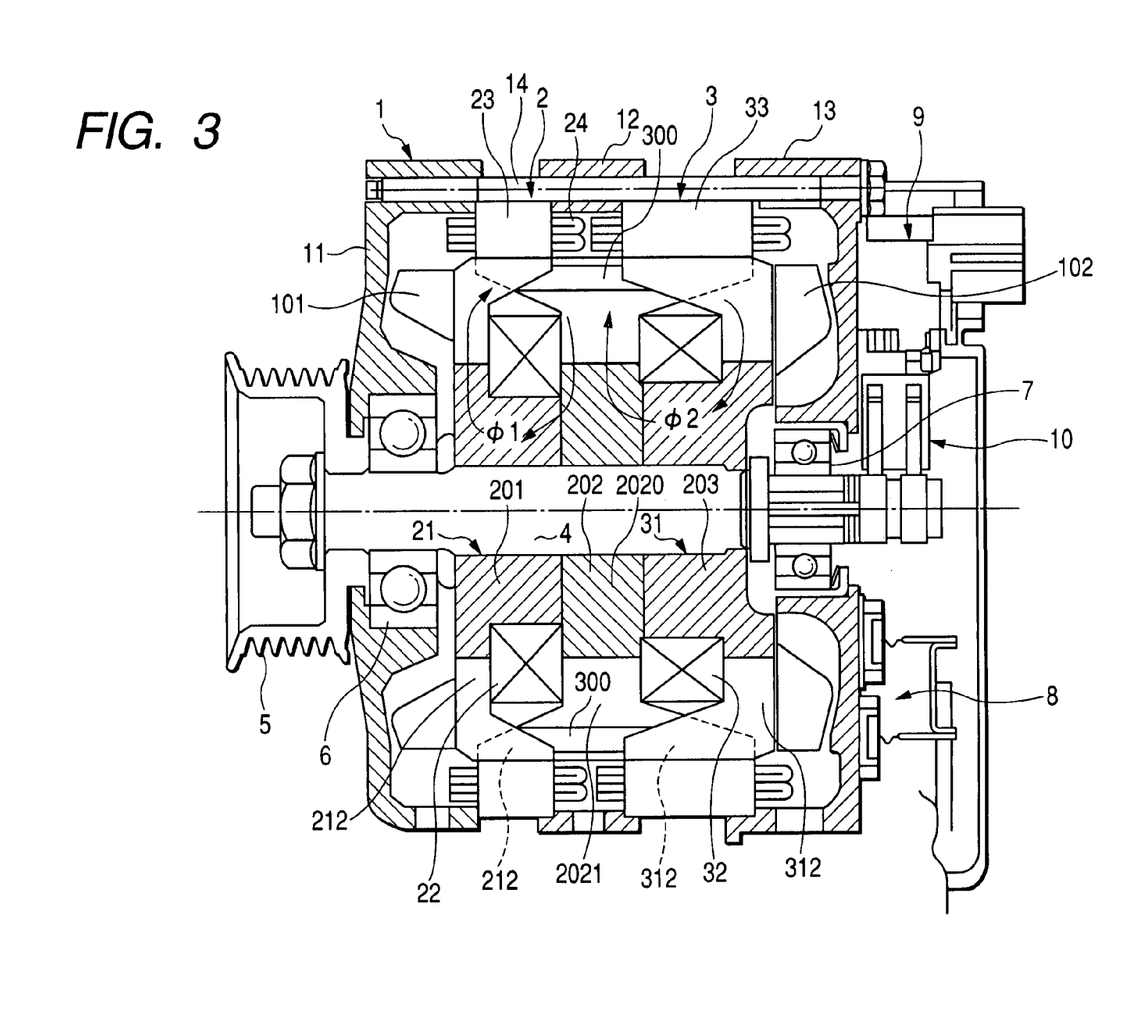
FIG. 3 is a sectional view in a rotor shaft direction of a tandem electric rotary machine having randel type rotary cores according to a third embodiment of the present invention.

The entire configuration of a tandem rotary electric machine for vehicle (or the vehicle alternator) according to the third embodiment of the present invention will now be described with reference to FIG. 3. FIG. 3 is a sectional view in a rotor shaft direction of the tandem rotary electric machine of the third embodiment.

The tandem rotary electric machine for vehicle according to the third embodiment is basically same in configuration of the tandem rotary electric machine for vehicle of the first embodiment and the second embodiment. Accordingly, one of the differenced in configuration between the third embodiment and the first and second embodiments will be explained.

The randel type rotor core 21 of the primary rotary electric machine (or the primary stator-rotor pair) 2 comprises a pair of half cores 201 and 202. The randel type rotor core 31 of the secondary rotary electric machine (or the secondary stator-rotor pair) 3 comprises a pair of the half cores 202 and a half core 203. That is, the randel type rotor cores 21 and 31 of the primary and secondary rotary electric machines 2 and 3 are made of the front half core 201, the middle half core 202, and the rear half core 203 that are connected in the rotary shaft direction. The front half core 201 is faced to and close to the middle half core 202 in series and the middle half core 202 is faced to and close to the rear half core 203 in series.

The front half core 201 shown in FIG. 3 has the same configuration of the front half of the randel type rotor core 21 in the primary rotary electric machine 2 shown in FIG. 1. The rear half core 203 shown in FIG. 3 has the same configuration of the rear half of the randel type rotor core 31 in the secondary rotary electric machine 3 shown in FIG. 1. The middle half core 202 shown in FIG. 3 has the configuration that is a combination of both the rear half of the randel type rotor core 21 in the primary rotary electric machine 2 and the front half of the randel type rotor core 31 in the secondary rotary electric machine 3 shown in FIG. 1.

The middle half core 202 has a claw base section (or a pole section) 2021 and claw sections 212 and 312. The claw base section 2021 (or a pole section) is radially extending from a boss section 2020. The claw sections 212 and 312 are extending in the opposite direction of the rotary shaft side. This configuration of the randel type rotor cores in the tandem rotary electric machine for vehicle according to the third embodiment can reduce the number of the configuration components, reduce the reluctance (or the magnetic resistance) of the magnetic path of field magnetic flux, and thereby reduce the magnitude of exciting current.

Reference number 300 designates one of centrifugal wings of non-magnetic material that are supported by the front part of the claw section 212 of the front half core 201 and the front part of the claw section 312 of the rear half core 203. Because this configuration of the centrifugal wings 300 can increase the number of centrifugal wings between the rotor cores 21 and 31, this configuration can promote the cooling of a pair of coil ends arranged in the gap between the stator-cores 22 and 23 efficiently.

Further, it is possible to fix the centrifugal wings 300 of non-magnetic material to the claw parts 2021 of the middle half core 202.

In the above configurations of the tandem rotary electric machine according to the first to third embodiment as shown in FIG. 1 to FIG. 3, the slip ring power supply mechanism 10 has a pair of the ship ring brushes. However the present invention is not limited by those configurations, for example, it is possible for the slip ring power supply mechanism 10 to have three or more slip ring brushes. In addition, the explanation for the manner to control the two kinds of exciting currents independently by the slip ring power supply mechanism 10 is omitted here because it has been known and out of the scope of the present invention.

As described above in detail, the tandem rotary electric machine according to the present invention has following features and effects.

The tandem rotary electric machine is naturally applicable to movable bodies such as a vehicle and capable of generating and outputting different direct current (DC) voltages to various electric loads, and further capable of controlling those difference DC voltages independently.

The primary stator-rotor pair and the secondary stator-rotor pair can provide different electric powers to electric loads of different types independently. The primary stator-rotor pair and the secondary stator-rotor pair can also provide the electric powers to same electric loads. In particular, the primary stator-rotor pair is capable of generating and outputting a normal electric power to the electric loads of high frequent and normal use. The secondary stator-rotor pair is capable of generating and outputting a highly electric power to the electric loads of less frequent use, namely, of intermittent use. It is acceptable to connect both the electric loads of high frequent use and the electrical loads of the intermittent use to the same power voltage, or it is also acceptable to connect them to different power voltages.

Furthermore, according to the present invention, it is possible to add rectified different output voltages supplied from both the primary stator-rotor pair and the secondary stator-rotor pair and then to output the added voltage to the high voltage electric loads of less frequent use, namely, of intermittent use. Further, it is possible to output the rectified output voltage from the primary stator-rotor pair to the low voltage electric loads of high frequent use, namely, of intermittent use.

In particular, the secondary stator-rotor pair generates and outputs a high rated electric power and the primary stator-rotor pair generates and outputs a low rated electric power. The secondary stator-rotor pair is placed close to the rectifier device side when compared in position with the primary stator-rotor pair. In another configuration, the secondary stator-rotor pair is placed at the end of the housing at which the secondary rectifier device is mounted. The stator core of the secondary stator-rotor pair has large size and weight than those of the stator core of the primary stator-rotor pair.

That is, according to another aspect of the present invention, the secondary stator-rotor pair is placed at the rectifier device side, not at the pulley side like a conventional one. This arrangement of the secondary stator-rotor pair of the present invention contradicts the configuration of conventionally available tandem rotary electric machines in which a secondary stator-rotor pair of large gyrating mass capable of providing a high rated electric power is placed at the pulley side. Because the stator core of the secondary stator-rotor pair having a large gyrating mass, a large weight, and a large heat capacity is placed at the rectifier device side or close to the rectifier device, the rectifier device can use, as heat sink, the stator core with a large heat capacity of the secondary stator-rotor pair through the housing of a relatively small heat resistance.

According to the present invention, the stator core of the secondary stator-rotor pair of a relatively large size and a large heat capacity is placed close to the secondary rectifier device side. This configuration allows the secondary rectifier device to use, as a heat sink, the stator core of the secondary stator-rotor pair having a small heat resistance through the housing.

Accordingly, this configuration of the tandem rotary electric machine of the present invention can efficiently prevent the temperature rise of plural rectifying components forming the rectifier device, that are faced to severe condition when compared with a normal alternator, and can eliminate the inhibition of the magnitude of maximum output current caused by the temperature rise of the rectifier device without increasing the volume and weight of the rotary electric machine.

According to another aspect of the present invention, the primary stator-rotor pair supplies electric power to electric loads of high frequent and normal use, and the secondary stator-rotor pair supplies electric power to electric loads of less frequent use. In the configuration of the present invention, the primary stator-rotor pair can be separated from the rectifier device, or from the secondary rectifier device in another configuration, because the temperature of the stator core of the primary stator-rotor pair is relatively high and the primary stator-rotor pair is used normally and the current usually flows through it. Further, the secondary stator-rotor pair is placed closely to the rectifier device, or from the secondary rectifier device in another configuration, because the secondary stator-rotor pair has the stator core of less frequent use and less heating frequent. It is preferred for the arrangement of the primary and secondary stator-rotor pairs of the present invention to dissipate the heat generated by the rectifier device. Because the temporary high heat, generated when the secondary rectifier device rectifies the output current from the secondary stator-rotor pair, can be dissipated through the secondary stator-rotor pair of a large size and a large weight, the configuration of the tandem rotary electric machine can promote its heat sink function.

Still further, according to another aspect of the present invention, a rated voltage of the electric loads of high frequent use is lower than a rated voltage of the electric loads of less frequent use. The primary stator-rotor pair generates and outputs a low voltage. The secondary stator-rotor pair generates and outputs a high voltage which is higher than the low voltage. According to the above configuration of the present invention, it is possible to suppress the increase of the magnitude of output current from the secondary stator-rotor pair even if the secondary stator-rotor pair supplies the large output current. It is thereby possible to enhance the heat sink function for cooling the rectifier components which form the rectifier device while preventing the temperature rise of the stator core of the secondary stator-rotor pair.

Still further, according to another aspect of the present invention, the primary stator-rotor pair supplies electric power to electric loads of high frequent and normal use, and the secondary stator-rotor pair supplies electric power to electric loads of less frequent use. The primary stator-rotor pair is placed at the pulley side and the secondary stator-rotor pair is placed at the rectifier device side. Further, in another configuration, the secondary stator-rotor pair is placed at the secondary rectifier device side.

That is, according to the above arrangement of the primary, secondary stator-rotor pairs, and the rectifier device and the housing, it is possible to dissipate the heat generated by the rectifier components forming the rectifier device efficiently, or to dissipate temporal highly heat energy, generated when the temporal large output current from the secondary stator-rotor pair is rectified, efficiently to the secondary stator-rotor pair of large size and weight, because the primary stator-rotor pair having the stator core of high frequent use and high temperature (because of usual current flow through it) is separated in position from the rectifier device or from the secondary rectifier device, and the secondary stator-rotor pair having the rotor core of less frequent use and less heating frequent is placed at the rectifier device side, or at the secondary rectifier device side.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. A tandem rotary electric machine comprising:
   a primary stator-rotor pair and a secondary stator-rotor pair, each pair comprising a rotor core on which field windings are wound and a stator core on which stator coils are wound, each rotor core being fixed to and driven by a same rotary shaft, and adjacently arranged to each other;
   a housing covering both the primary stator-rotor pair and the secondary stator-rotor pair, and to which the stator cores of both the primary stator-rotor pair and the secondary stator-rotor pair are fixed; and
   a rectifier device, configured to rectify output current from the primary stator-rotor pair and the secondary stator-rotor pair, fixed directly to one end of the housing or fixed to one end of the housing through an interposition member in order to dissipate heat generated by the rectifier device,
   wherein the secondary stator-rotor pair, capable of generating and outputting a higher rated electric power than a low rated electric power generated by the primary stator-rotor pair, is disposed between the primary stator-rotor pair and the rectifier device, and the stator core of the secondary stator-rotor pair has larger size and weight than those of the stator core of the primary stator-rotor pair.

2. The tandem rotary electric machine according to claim 1, wherein each rotor core is a randel type rotor core, and both the primary stator-rotor pair and the secondary stator-rotor pair are driven by an engine on a vehicle, wherein
   the tandem rotary electric machine further comprises:
   a pulley fixed to a protruded part of the rotary shaft, that is protruded from one end surface of the housing, that is opposed in position to an other end surface of the housing at which the rectifier device is mounted; and
   a controller configured to control exciting currents flowing through the primary stator-rotor pair and the secondary stator-rotor pair.

3. The tandem rotary electric machine according to claim 2, wherein the primary stator-rotor pair supplies electric power to electric loads of frequent and normal use, and the secondary stator-rotor pair supplies electric power to electric loads of less frequent use.

4. The tandem rotary electric machine according to claim 3, wherein a rated voltage of the electric loads of frequent and normal use is a low voltage, and a rated voltage of the electric loads of less frequent use is a high voltage, which is higher than the low voltage, and the primary stator-rotor pair generates and outputs the low voltage, and the secondary stator-rotor pair generates and outputs the high voltage.

5. The tandem rotary electric machine according to claim 2, wherein the primary stator-rotor pair supplies electric power to electric loads of frequent and normal use, and the secondary stator-rotor pair supplies electric power to electric loads of less frequent use, and the primary stator-rotor pair is placed at a pulley side and the secondary stator-rotor pair is placed at a rectifier device side.

6. The tandem rotary electric machine according to claim 5, wherein a rated voltage of the electric loads of frequent and normal use is a low voltage, and a rated voltage of the electric loads of less frequent use is a high voltage, which is higher than the low voltage, and the primary stator-rotor pair generates and outputs the low voltage, and the secondary stator-rotor pair generates and outputs the high voltage.

7. The tandem rotary electric machine according to claim 2, wherein a rear part of the rotor core in the primary stator-rotor pair and a front part of the rotor core in the secondary stator-rotor pair are formed in an integral body as a common part.

8. The tandem rotary electric machine according to claim 1, wherein a rear part of the rotor core in the primary stator-rotor pair and a front part of the rotor core in the secondary stator-rotor pair are formed in an integral body as a common part.

9. A tandem rotary electric machine comprising:

a primary stator-rotor pair and a secondary stator-rotor pair, each pair comprising a rotor core on which field windings are wound and a stator core on which stator coils are wound, each rotor core being fixed to and driven by a same rotary shaft, and adjacently arranged to each other;

a housing covering both the primary stator-rotor pair and the secondary stator-rotor pair, and to which the stator cores in the primary and secondary stator-rotor pairs are fixed;

a primary rectifier device, configured to rectify output current from the primary stator-rotor pair, fixed directly to a first end of the housing or fixed to the first end of the housing through an interposition member in order to dissipate heat generated by the primary rectifier device; and a secondary rectifier device, configured to rectify output current from the secondary stator-rotor pair, fixed directly to a second end of the housing or fixed to the second end of the housing through an interposition member in order to dissipate heat generated by the secondary rectifier device, wherein the secondary stator-rotor pair, capable of generating and outputting a higher rated electric power than a low rated electric power generated by the primary stator-rotor pair, is disposed between the primary stator-rotor pair and the secondary rectifier device, and the stator core of the secondary stator-rotor pair has larger size and weight than those of the stator core of the primary stator-rotor pair.

10. The tandem rotary electric machine according to claim 9, wherein each rotor core is a randel type rotor core, and both the primary stator-rotor pair and the secondary stator-rotor pair are driven by an engine on a vehicle, wherein the tandem rotary electric machine further comprises:

a pulley fixed to a protruded part of the rotary shaft, that is protruded from one end surface of the housing, that is opposed in position to an other end surface of the housing at which the primary rectifier device is mounted; and a controller configured to control exciting currents flowing through the primary stator-rotor pair and the secondary stator-rotor pair.

11. The tandem rotary electric machine according to claim 10, wherein the primary stator-rotor pair supplies electric power to electric loads of frequent and normal use, and the secondary stator-rotor pair supplies electric power to electric loads of less frequent use.

12. The tandem rotary electric machine according to claim 11, wherein a rated voltage of the electric loads of frequent and normal use is a low voltage, and a rated voltage of the electric loads of less frequent use is a high voltage, which is higher than the low voltage, and the primary stator-rotor pair generates and outputs the low voltage, and the secondary stator-rotor pair generates and outputs the high voltage.

13. The tandem rotary electric machine according to claim 10, wherein the primary stator-rotor pair supplies electric power to electric loads of frequent and normal use, the secondary stator-rotor pair supplies electric power to electric loads of less frequent use, and the secondary stator-rotor pair is placed at a secondary rectifier device side.

14. The tandem rotary electric machine according to claim 13, wherein a rated voltage of the electric loads of high frequent and normal use is a low voltage, and a rated voltage of the electric loads of less frequent use is a high voltage, which is higher than the low voltage, and the primary stator-rotor pair generates and outputs the low voltage, and the secondary stator-rotor pair generates and outputs the high voltage.

* * * * *